July 13, 1965 R. BRAY 3,195,050

ELECTRICAL APPARATUS AND METHOD OF FABRICATING IT

Filed Dec. 21, 1962 2 Sheets-Sheet 1

INVENTOR
RALPH BRAY
BY
Frank D Prager
ATTORNEY

July 13, 1965 R. BRAY 3,195,050

ELECTRICAL APPARATUS AND METHOD OF FABRICATING IT

Filed Dec. 21, 1962 2 Sheets-Sheet 2

INVENTOR
RALPH BRAY
BY
Frank D. Porges
ATTORNEY

3,195,050
ELECTRICAL APPARATUS AND METHOD OF FABRICATING IT

Ralph Bray, Philadelphia, Pa., assignor to Philco Corporation, Philadelphia, Pa., a corporation of Delaware Filed Dec. 21, 1962, Ser. No. 246,414
2 Claims. (Cl. 325—363)

This invention relates to tuners and to methods of constructing tuners. In particular, and while capable of broader application, the invention relates to mechanically controlled radio tuners for automobiles.

In the mass manufacture of such apparatus it has been found advantageous to fabricate the circuit units as self-contained subassemblies of tuning coils and associated electronic components, while building the associated core carriage mechanisms as separate self-contained units. These latter units can then be made by simple machine-shop operations, geared only to the forming and assembling of metal parts, while the circuit units are then produced by differently conducted but equally simple operations, combining the various coils etc. with a suitable panel. Inserting, dip-soldering, and related operations are used for this latter purpose; they are subject to requirements vastly different from the metal-working routines desirably followed in constructing the core carriage and the linkages and housing thereof.

Because of the necessary cooperation of the core unit with the tuning coils and circuits, difficulties were for some time encountered in making the combination and juxtaposition of the several subassemblies as compact as was desired and in also keeping their fabrication effective and economical. Attempts were heretofore made to improve tuner techniques in some or all of these respects, but further improvement remained necessary which has been achieved by this invention.

The invention provides, as a self-contained circuit subassembly, a board having the required tuning coils mounted on one side thereof, said board having the other circuit components mounted on its other side. The coil-supporting side of the new board can be brought closely to an end surface of a compact, self-contained push button and core mechanism. The size of the complete tuner can thus be minimized and at the same time, the fabricating and assembling operations become uniquely simple and effective. In addition, necessary electronic tests are facilitated.

Figures 1, 2, 3:
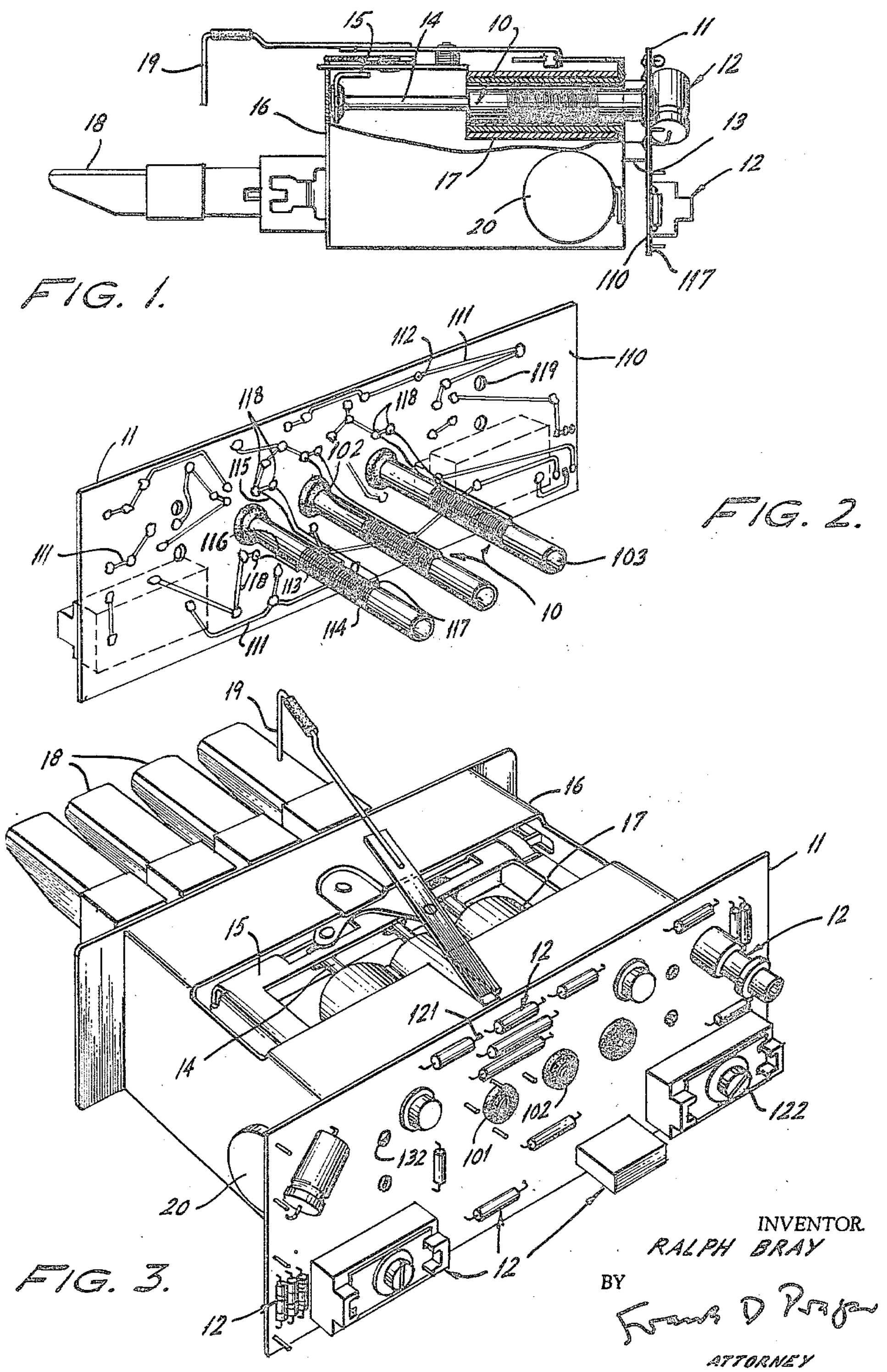
Figure 4:
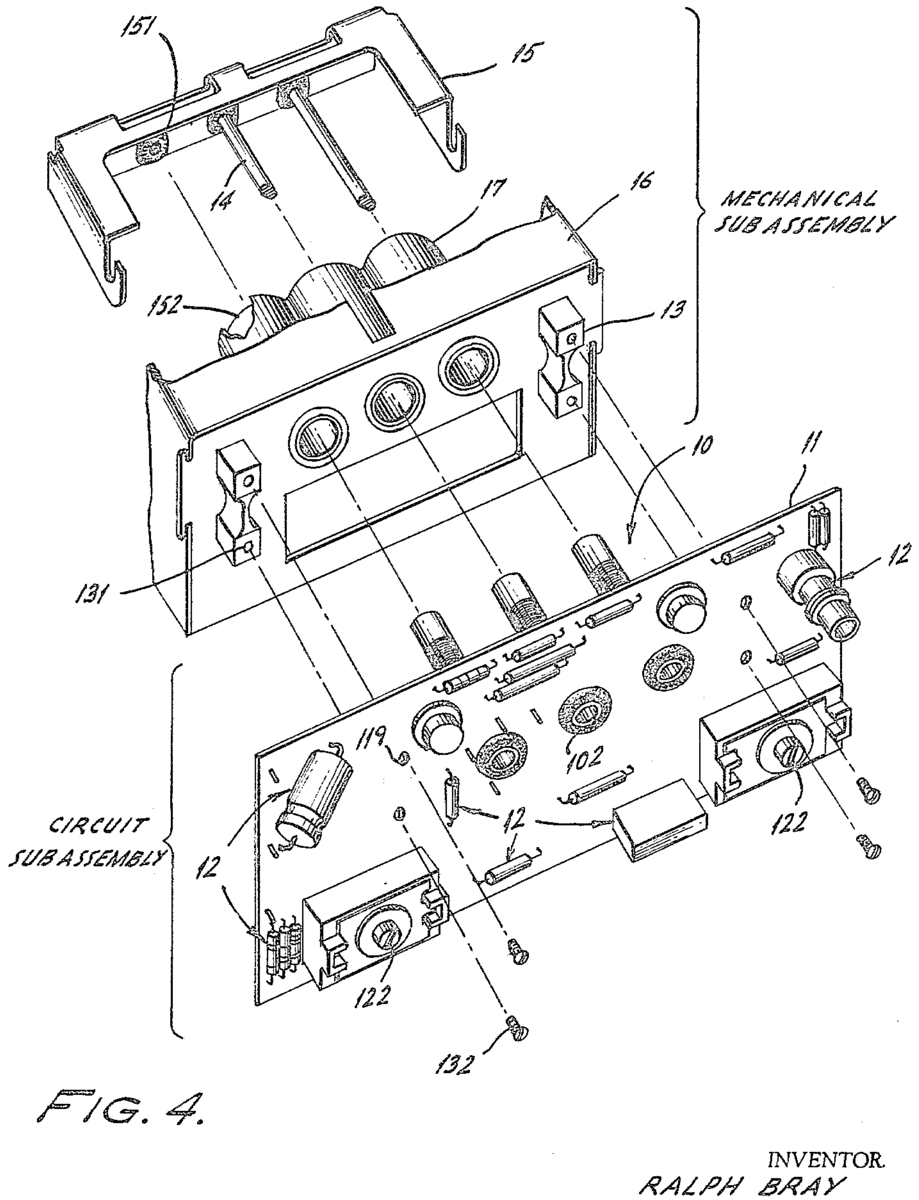

For further explanation of these objects, features and advantages, reference will be made to a preferred embodiment of the invention, illustrated in the drawing appended hereto. FIGURE 1 is a side elevational view of the new tuner, with wall portions broken away to disclose tuning elements. FIGURE 2 is a perspective view of the new circuit subassembly, seen from the side which in FIGURE 1 appears at the left of this subassembly. FIGURE 3 is a perspective view of the assembled tuner, wherein the circuit board is seen from the side which appears in FIGURE 1 at the extreme right. FIGURE 4 is an additional perspective view, showing the tuner in generally similar orientation as in FIGURE 3, but showing it in exploded and somewhat fragmentary form.

Referring to FIGURES 1 to 3, the new tuner has tuning coils 10—for instance, RF and oscillator tuning coils—permanently secured to one side surface of insulating circuit board 11, the other side of which carries the associated tuning circuit components 12. A circuit subassembly 10, 11, 12 is thus provided. It is connected with a mounting structure 13 forming part of a mechanical or push button subassembly which contains axially movable cores 14 for coils 10.

These cores, consisting of permanently magnetized ferrite or the like, are mounted on carriage 15 slidable in housing 16. The housing is a compact, box-like structure, roughly as long as the cores plus the extent of their travel into the coils, and roughly as wide as the system of cores. This housing also contains shield members 17, one for each coil and core system 10, 14, and which extend into the housing from adjacent the connector structure 13 supporting the circuit unit. At the opposite end the housing has push buttons 18 extending therefrom. Each push button is selectively connected with core carriage 15 by suitable devices, not shown in detail, for shifting the carriage to move the cores into various predetermined positions relative to the coils 10, there being as many such positions as there are push buttons. A pointer 19 may be provided, in association with a suitable dial (not shown), to indicate the different positions reached by the system of cores. Additionally, shifting of the core system between these predetermined points can be controlled by a rotatable clutch unit 20, as is well known to the art.

The new circuit unit according to the invention is best shown in FIGURE 2. Tuning coils 10 extend from, and are normal to, that side 110 of board 11 which is directly mounted on support structure 13 of box-like housing 16, FIGURE 4. Substantially the full length of these coils extends into shield members 17 in said housing, FIGURE 1, coaxially therewith and with cores 14, for variable insertion of these cores into the coils to effect the desired tuning. Advantageously the coil-supporting side 110 of circuit board 11, FIGURE 2, has conductors—for instance printed conductor strips 111—formed thereon and connected with lead wires 121 of the various components by solder spots 112, which can be provided advantageously by dip-soldering prior to attachment of coils 10 to board 11. Suitably spaced from these connecting elements, board 11 has coil insertion apertures 101, FIGURE 3, desirably provided with resilient grommets 102, FIGURES 2, 3, for the reception of insulator cylinders 103 supporting the tuning coils.

One or several windings 113 etc. are provided by each tuning coil; for instance FIGURE 2 shows a first coil having windings 113, 114, center tap connection 115 and end connections 116, 117. These various connections are fastened and connected to wiring 111 on coil side 110 of board 11 by solder spots 118 etc.; these solder spots are advantageously hand-soldered, or at any rate individually made, after the dip-soldering of the other components.

Panel 11 has a number of bolt holes 119 formed therein, FIGURE 4, and registered with tapped holes 131 in the surface of connector structure 13 of core housing 16. The coil and core subassemblies 10, 11, 12 and 14, 15, 16 can be united by a set of bolts or screws 132, suitably inserted through these holes. By means of these arrangements, based largely on the use of the new, separate, two-sided circuit and tuning coil subassembly 10, 11, 12, the complete tuner can be made in very compact and economical form and can also be fabricated, as will now be considered, by highly effective manufacturing methods. While many of the individual manufacturing operations require no detailed statement, the following points will be noted.

Ordinary machine and shop operations are initially used to produce the core box 16, desirably complete with carriage 15, shields 17, and mechanism 18 to 20, all of which can be made of suitable metal parts. In a separate fabricating operation, use is made of component inserting and connecting techniques, desirably of dip-soldering type, to produce circuit subassembly 10, 11, 12. At several stages, fabricating work is facilitated by this new combination of techniques. For instance in the mechanical machine-shop work for the production of the all-metal core box unit, it is possible to apply the usual metal punching, bending and machining operations, aided by application of various lubricants and the like, and it becomes unnecessary to protect any delicate electrical components from the difficulties which they would encounter when subjected to such workship procedures. The magnetic ferrite cores can also be omitted at this stage; carriage 15 can simply be provided with suitably located and oriented apertures and grommets 151, FIGURE 4, wherein ferrite cores 14 can later be inserted. Thus the manufacture of the mechanical subassembly is facilitated in that it is substantially reduced to a series of metal working steps, wherein carriage 15, housing 16, shields 17 and associated linkages and mechanical connectors are produced and assembled. On the other hand the insertion, soldering, and related operations used in production of electronic subassembly 10, 11, 12 are no longer complicated by any need for handling relatively massive metal parts or the like.

When mechanical and electrical subassemblies have thus been produced, they are simply united by inserting coils 10, carried by board 11, into shields 17 of housing 16. Incident to this operation, portions of cores 14 enter the insulating cylinders 103 of coils 10. Contact between coil windings 113 etc. and the shield metal can be prevented by previous insertion of insulating sleeves 152 in said shields. The uniting and inserting operation also brings bolt holes 119 of board 11 into the direct vicinity of tapped holes 131 on support structure 13, and the board can then be fastened to this structure by bolts 132. Electronic alignment of the tuning circuits is then most readily effected by suitable adjustment of trimmers 122, forming part of circuitry 12 on board 11.

It may be assumed that circuitry 10, 12, 112, etc. has previously been tested for continuity and for the needed electronic characteristics, as is usual in the manufacture of such devices. Subsequent electronic testing of the entire tuner may become desirable at various times, for instance incident to service operations, and such a retesting operation is not only possible but actually facilitated by the new arrangement, in comparison with former arrangements wherein all or some of the electrical components were installed between the circuit board and the core housing. Testing probles can readily be brought into suitable contact for instance with lead wires 121, FIGURE 3, for desired determinations of conductance, inductance and other significant characteristics of components or of component subassemblies.

While only a single embodiment of the invention has been described, the details thereof are not to be construed as limitative of the invention. The invention contemplates such variations and modifications as come within the scope of the appended claims.

I claim:

1. A method of fabricating a radio tuner, comprising:

(A) as an operation of the component inserting and connecting type, the steps of:

(a) inserting substantially all circuit components of a tuner, other than the tuning coils, on one and only one side of a printed circuit board, with lead wires of said components extending through the board for connection with printed connector strips on the other side of the board;

(b) then dip soldering the inserted lead wires to said connector strips on said other side of the board;

(c) thereafter mounting the tuning coils on said other side of the board, at predetermined points thereof, and connecting them to the proper connector strips to complete a circuit panel; and, (B) as an operation of the mechanical machine assembling type, the steps of:

(a) providing a tuner housing with a tuner carriage shiftable therein and with magnetic tuning cores mounted upon said carriage at locations disposed for spatial alignment with said tuning coils; and (b) assembling said housing and carriage with the completed circuit panel in such a way as to insert said cores shiftably within said coils.

2. A method as described in claim 1, and including the additional step of aligning the circuit by adjusting circuit components, inserted on said one side of the board, pursuant to the assembling of the completed circuit panel with the tuner housing and carriage, and insertion of the cores in said coils.

References Cited by the Examiner

UNITED STATES PATENTS

| | | | |
|---|---|---|---|
| 2,468,727 | 5/49 | Bauman | 325—352 |
| 2,770,724 | 11/56 | Frihart et al. | 325—452 |
| 2,771,547 | 11/56 | Bell et al. | 334—77 |

DAVID G. REDINBAUGH, *Primary Examiner.*